United States Patent Office 2,944,596
Patented July 12, 1960

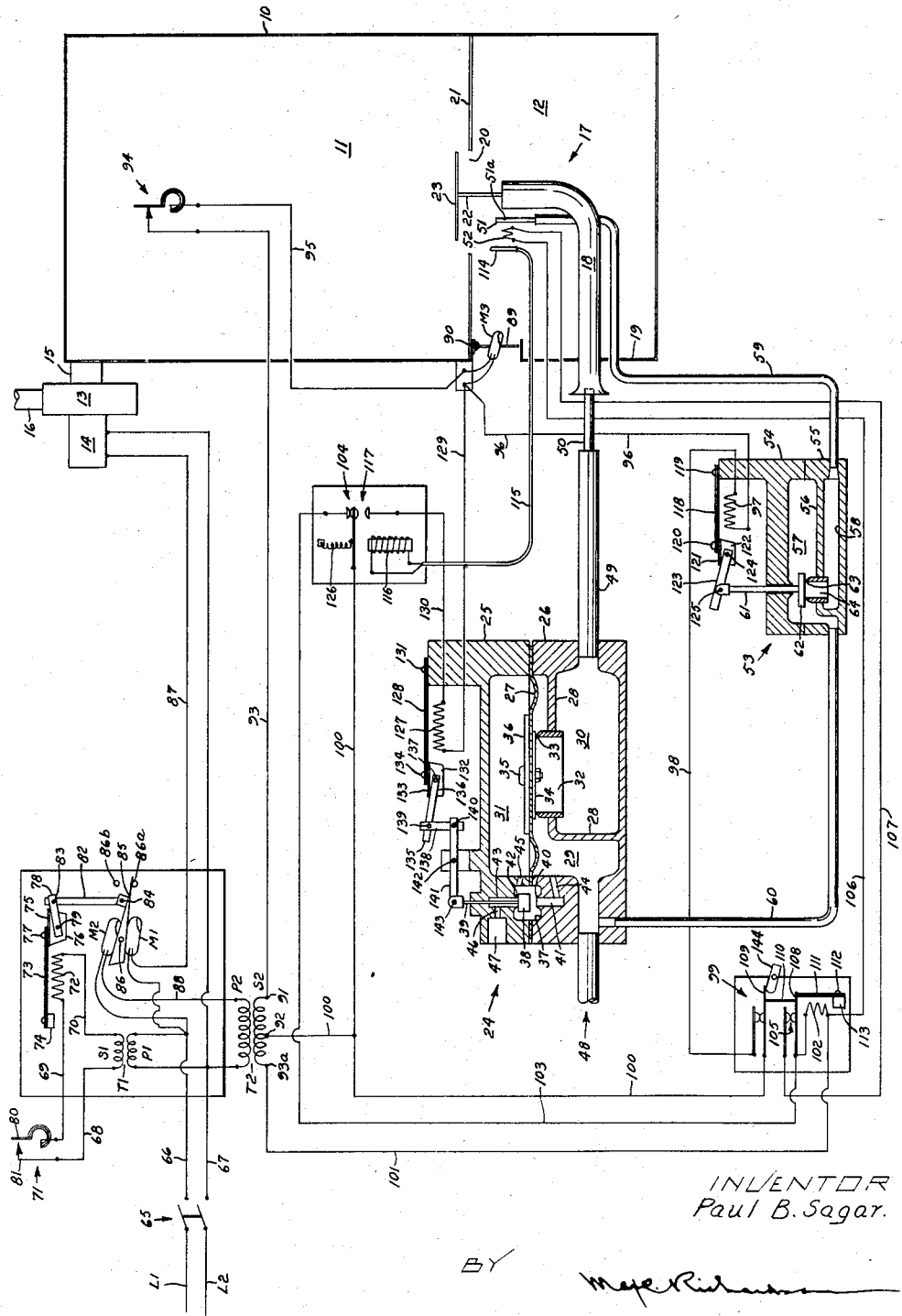

2,944,596

INDUCED DRAFT GAS FIRED SPACE HEATING SYSTEM

Paul B. Sagar, 1331 SE. 51st Ave., Portland, Oreg.

Filed Jan. 20, 1958, Ser. No. 710,011

7 Claims. (Cl. 158—7)

This invention relates generally to gas fired space heaters and their controls and more particularly to an intermittently operated induced draft furnace using a system of intermittent ignition of the pilot gas flame.

It is a primary object of this invention to provide a quiet operating reliable induced draft gas fired space heating furnace having mechanical means for inducing combustion air and fuel into the furnace and for inducing spent combustion gases out of the furnace.

It is a second object to provide simple and reliable means for controlling the supply of fuel and air to the furnace and controlling the removal of combustion gases from the furnace.

It is a third object to provide simple and reliable electrical control means for an induced draft gas fired space heating furnace which will intermittently supply and ignite an air and gas mixture in response to the intermittent demand of a thermostat in the space to be heated.

It is a fourth object to provide such a control system with control means for initiating an operation of such a furnace in properly sequential steps.

It is a fifth object to provide such a control system with quietly operating relay means.

It is a sixth object to provide such a control system with relay operating means of the operating energy integrating type to prevent noise and chatter of the relays.

How these and other objects are attained is explained in the following description, referring to the attached drawing, in which the single figure shows schematically a furnace, means for supplying gas fuel to the furnace, means for inducing combustion air into the furnace, means for exhausting spent combustion gases from the furnace, means for igniting the fuel and air supplied to the furnace, and means for intermittently operating the above mentioned means in sequential response to a condition.

Reference numerals in the description will refer to like numbered parts of the drawing.

In the scheme of the drawing a simple gas furnace body 10 is shown to enclose a combustion chamber 11 and a combustion air plenum chamber 12. An induced draft fan 13 driven by electric motor 14 has its inlet duct 15 leading from combustion space 11, as shown, and its outlet duct 16 leading to the atmosphere.

The gas burner 17 associated with the furnace is seen to have an elbow type hollow mixing tube 18 sealed into the front panel 19 of the plenum chamber part of furnace body 10, with the belled entrance end of the tube 18 extending horizontally outside the furnace and its outlet end pointing vertically upward concentrically with the opening 20 in horizontal barrier 21 dividing combustion chamber 11 from plenum chamber 12. Heat resisting stem 22 supports heat resisting baffle 23 in combustion chamber 11 just above and concentric with opening 20 in partition 21.

Main gas valve 24 has an upper body part 25 and a lower body part 26 securing therebetween a flexible diaphragm 27 by screws, not shown. Barrier 28 and diaphragm 27 divide the interior of parts 25, 26 into an inlet chamber 29, an outlet chamber 30, and a control chamber 31. Cylindrical main valve port wall 32 forming part of barrier 28 has main valve seat 33 formed about its upper end while main valve 34 is secured to diaphragm 27 by screw 35 and biased gravitationally towards its closed position on seat 33 as shown by plate 36 also secured on diaphragm 27 by screw 35.

Also formed within parts 25 and 26 of valve 24 is a control valve chamber 37 enclosing control valve 38 secured to control valve stem 39 guided in body part 25, as shown, for vertical movement between control valve inlet seat 40 formed around control inlet port 41 and control valve exhaust seat 42 formed around control outlet port 43. Passageway 44 connects inlet chamber 29 with control inlet port 41, passageway 45 connects control chamber 31 with control valve chamber 37 and passageway 46 connects control outlet port 43 with exhaust port 47.

Main gas valve inlet chamber 29 is filled at all times with fuel gas under a regulated pressure by main gas line 48. This gas supply pressure is more than enough when applied to the underside of diaphragm 27 in chamber 29 to raise main valve 34 off its seat 33 provided control valve 38 in chamber 37 is closed on its seat 40 and opened from its exhaust seat 42. But in its position shown on exhaust seat 42 and away from inlet seat 40, control valve 38 allows gas at supply pressure to flow from inlet chamber 29 to control chamber 31 via passageway 44, port 41, control valve chamber 37 and passageway 45, to equalize the gas pressures in chambers 29 and 31 and main valve 34 will gravitationally close on its seat 33 as shown.

When control valve stem 39 moves control valve 38 down to close on its seat 40, diaphragm 27 and valve 34 will move upward to pass fuel gas from chamber 29 through main valve 33, 34 to outlet chamber 30 and on through pipe 49 and tube 50 from which the fuel gas is emitted into the inlet end of mixing tube 18 with sufficient energy to entrain and carry with it a selected amount of primary air as set by an air control, not shown, at the entrance of tube 18. The mixture of gas and air discharging from the vertical end of tube 18 is ignited by gas flame emitted from ports 51a in pilot burner 51. Burner 51 is ignited by hot wire igniter 52 as will be explained.

Pilot gas control valve 53 is seen to comprise two body parts 54 and 55 connected by screws, not shown, to enclose a cavity divided by barrier 56 into an inlet chamber 57 and an outlet chamber 58 connected by tube 59 with pilot burner 51. Tube 60 connects main gas pipe 48 with pilot valve inlet chamber 57. When its stem 61 raises pilot valve 62 off its seat 63 formed about port 64 in barrier 56 gas will flow from pipe 48 to pilot burner 51 through tube 60, valve 53, and tube 59.

In considering the electrical parts of my scheme, L1 and L2, are to denote a 110 volt, 60 cycle, a single phase, electric source connected by a D.P.S.T. switch 65 to the 110 v., 60 cycle supply lines 66, 67 of my control system. Line 67 connects to one terminal of primary winding P1 of transformer T1, one terminal of primary winding P2 of transformer T2 and one terminal of motor 14. The other end of primary winding P1 is connected to line 66 so that P1 is energized at all times. The secondary winding S1 of transformer T1 is connected serially by wires 68, 69, 70 with space thermostat 71 and resistance heater 72 of bimetal 73 fixed at one end to stationary support 74 and carrying at its free end an angle shaped support having a horizontal leg 75 secured to bimetal 73 by screw 77 and a vertical leg 76 to which link 78 is frictionally and pivotally secured at 79. The rotation of link 78 about connection 79 is frictionally resisted and is limited in both directions by the interference of the overhang of horizontal leg 75.

When there is a demand for heat in the space in which thermostat 71 is located its bimetal movable contact 80 closes on its stationary contact 81 and heater 72 is energized to heat bimetal 73 slowly to lift support 75, 76 taking with it link 78 and link 82 pivoted at 83 to link 78 and at 84 to carrier 85 of mercury switches M1 and M2 secured thereto. Carrier 85 is pivoted about axle 86 for rotation in either direction as limited clockwise by the stationary pin 86a of bimetal 73 and counterclockwise by stationary pin 86b.

As bimetal 73 gets warm carrier 85 rotates counterclockwise, first to close mercury switch M1 to connect motor 14 through line 87 between lines 66 and 67 and then to close mercury switch M2 to connect primary winding P2 of transformer T2 through line 88 between lines 66 and 67, after which the end of carrier 85 strikes pin 86b to stop the rotation of carrier 85. Further heating of bimetal 73 causes link 78 frictionally to slip on angle leg 76 so that when thermostat 71 opens its contacts and bimetal 73 starts to cool, carrier 85 will rotate clockwise without delay first to open switch M2 and then to open switch M1.

But when mercury switch M1 was closed to energize motor 14, fan 13 began to exhaust air from the combustion chamber 11 and plenum chamber 12 of furnace body 10 which reduced the air pressure in space 12 and allowed atmospheric air to push damper 89, hinged at 90, inwardly to admit air into space 12. As damper 89 swings inwardly, mercury switch M3 positioned thereon, as shown, tilts counterclockwise and closes a circuit connecting the right hand end 91 of secondary winding S2 of transformer T2 to the midtap 92 of winding S2 via line 93, furnace limit thermostat 94, line 95, switch M3, line 96, pilot valve switch operator heater 97, line 98, safety switch 99 and line 100.

At that time under the burner starting conditions illustrated a first circuit is already set up between the left hand end 93a of secondary winding S2 of transformer T2 and its midtap 92 via wire 101, safety timer heater 102, wire 103, transfer switch 104 and wire 100. Safety switch 105 parallels glow wire pilot flame igniter 52 with safety timer heater 102 via wires 106, 107.

The movable blades 108 and 109 of safety switches 105 and 99 are linked by insulating strut 110 and biased downwardly away from their respective stationary blades by their own resilience. However bimetal timing strut 111 secured by screw 112 to post 113 is positioned as shown when cold to support blade 108 of switch 105 in its closed circuit position and through strut 110 to support blade 109 of switch 99 in its closed position. Should timing heater 102 heat bimetal blade 111 to move its free upper end to the right, out from under blade 108, both blades 108 and 109 will drop to open switches 105 and 99.

After the closure of mercury switch M1 starts motor 14 and air induced by fan 13 moves damper 89 to close mercury switch M3 mercury switch M2 is closed to energize primary winding P2 of transformer T2. Consequently the above described three circuits connected to the secondary winding S2 of transformer T2 are energized.

Glow wire igniter 52 starts to heat up to be ready to ignite the pilot flame gas at pilot gas burner 51 which in turn heats thermoelectric generator 114 connected by two-wire cable 115 to the winding of solenoid operator 116 of transfer switch 117.

Safety timer heater 102 starts to heat up timer bimetal 111 and if heater 102 is not shut off within a preset time bimetal 111 will trip open both safety switches 99 and 105.

Pilot burner valve operator heater 97 starts to heat bimetal valve operator 118 secured at one end by screw 119 to body part 54 of control valve 53. The free end of bimetal 118 carries by screw 120 at its free end an angle shaped support having a horizontal leg 121 and a vertical leg 122 to which link 123 is frictionally and pivotally secured at 124. The rotation of link 123 about pivot 124 in either direction is resisted by frictional engagement of link 123 with vertical leg 122 and by limit abutment of link 123 with horizontal leg 121. Link 123 is pivoted at 125 to stem 61 of valve 62 of pilot flame gas valve 53.

As bimetal operator 118 is heated by heater 97 and through the above described mechanism lifts valve 62 off its seat 63, pilot flame gas flows from source 48 through tube 60, control 53 and tube 59 to pilot burner 51 where it is ignited by glow wire 52.

After the pilot flame about burner 51 is in operation, sufficient heat is absorbed by the thermoelectric generator 114 to energize solenoid switch operator 116 to open switch 104 against the bias of its operating spring 126 and close switch 117.

If the opening of switch 104 has been accomplished before safety switches 99 and 105 are opened by timing mechanism 102, 111, the apparatus is operating in its planned manner and line 103 is now disconnected from line 100 and transformer tap 92 to deenergize both safety timing heater 102 and glow wire 52.

Closing switch 117 energizes heater 127 of bimetal operator 128 of control valve 38 of main gas control 24 via terminal 91 of secondary winding S2 of transformer T2, line 93, limit control 94, line 95, air flow switch M3, line 129, heater 127, line 130, switch 117 and line 100 to transformer terminal 92. Bimetal operator 128 is secured at one end by screw 131 to body part 25 of main control structure 24. Angular support 132 has its horizontal leg 133 secured by screw 134 to the free end of operator 128. Link 135 is frictionally and pivotally secured to vertical leg 136 at 137. Its motion about axle 137 is frictionally resisted in either direction by vertical leg 136 and limited in either direction by abutment with horizontal leg 133. Link 138 is pivoted at 139 with link 135 and at 140 with lever 141 fulcrumed at 142 on body part 25 and pivoted at 143 to stem 39 of control valve 38 of main gas control 24.

As heater 127 heats operator 128 control valve 38 will move from its seat 42 to its seat 40 thus disconnecting space 31 from space 29 and connecting space 31 to atmosphere through port 47. Gas pressure in space 29 lifts diaphragm 27 and valve 34 to admit fuel gas at its preset rate to burner 17 and the main gas burner is in full operation to remain in full operation until thermostat 71 opens or an emergency arises. With space thermostat 71 closed an emergency stopping of the main burner could be caused by an opening of limit control 94 due to an oversupply of heat, an opening of mercury switch M3 due to a failure of fan 13 to operate as required, or a flame failure at the pilot burner which would reduce the energy of solenoid 116 below the energy of biasing spring 126. Should the latter occur, heater 127 of main valve control valve operator 128 would be deenergized and valve 33, 34 would close to cut off the main gas supply and safety timer heater 102 would be energized to cause bimetal 111 to trip open safety switches 99 and 105 to cause a complete shut down until reset lever 144 is rotated clockwise to reset safety switches 99 and 105 when a normal starting sequence of the system can be repeated.

The normal starting operation following the above description can be more briefly stated as follows.

When sensing instrument 71 closes, heater 72 begins to heat bimetal 73 which, as previously described, starts carrier 85 to rotate counterclockwise first to close switch M1 to start induced draft fan motor 14 and then to close switch M2 to energize transformer T2.

Starting the fan motor closes draft assurance safety switch M3 and connects one end of the circuit of the pilot gas valve operating means 97 to the secondary of transformer T2. Then when switch M2 energizes the secondary of transformer T2, the safety timer 102, the glow wire igniter 52 and the pilot gas valve operating means are energized. If the pilot gas valve feeds gas to the pilot burner 51 and if the glow wire 52 gets hot and ignites the pilot flame at 51a and if the thermoelectric generator 114 energizes the solenoid 116 of the transfer switch 104, 117, to deenergize the safety timer 102 and energize the main gas control valve operator 127 within the preset timing period the system will proceed to complete operation. However, if the preset safety timing period is exceeded before the transfer switch operates the safety timing switches open and the system can not be started until the safety timing switches are manually reset at 144.

When the sensing instrument is satisfied and deenergizes the starting relay, first the primary winding of transformer T2 is deenergized to deenergize all timing, ignition and gas valve controls to return them to their respective off or starting positions, and second, after a furnace purging period the fan motor is deenergized.

It is to be noted that with the induced draft system of this invention, it is not desirable to keep the draft fan motor running when no heat is required and, of course, with no furnace draft it would not be desired or safe to try to keep a pilot light in operation. Therefore electrical means are provided to ignite the pilot light whenever there is a call for heat.

Also with a system having a draft through the furnace only when heat is desired, safety requires that the draft supply mechanism be put into operation and proved before any other part of the system is put in operation on a call for heat. Then after the heat requirement is satisfied it is desirable to keep the draft supply mechanism in operation for a purging period after the shut down of any gas supply to the furnace. It is seen that the present system provides both these purging periods.

It should also be noted that only the simplest type of space thermostat is required for this system although snap action types can be used. With the space thermostat supplying electrical energy to an integrating heat absorbing bimetal actuator no chattering of the relay is possible and the relay will be quiet in operation.

It is a special feature of the relay and valve operators of this system that either in their starting or stopping directions of operation they are ready for instant operation on a change of direction of the heating or cooling trend.

Having recited some of the objects of my invention, illustrated and described a preferred form in which my invention may be practiced and explained its operation, I claim:

1. An induced draft gas fired heating system and a control system therefor, said heating system comprising a furnace for supplying heat to a space, a source of fuel gas, a source of combustion air, a normally inactive induction means for inducing combustion air from said source thereof into said furnace, motor means for operating said air induction means, a main gas burner in said furnace, a normally closed main gas valve operable to permit the flow of gas from said source thereof to said main burner, a pilot gas burner adjacent said main gas burner in said furnace and a normally closed pilot gas valve operable to permit the flow of gas from said source thereof to said pilot burner, and said control system comprising: a normally open air safety switch; an air safety switch operating means responsive to the pressure of air in said furnace to close said air switch at a preset reduction below atmospheric pressure of said pressure in said furnace; a first normally closed safety time switch, a second normally closed safety time switch, and an electrically operable safety timing means for simultaneously opening both of said safety time switches after said timing means has been energized for a preset time; an electric main valve operator for opening said main gas valve when said main valve operator is energized and closing said main valve when said main valve operator is deenergized; an electric pilot valve operator for opening said pilot gas valve when said pilot valve operator is energized and closing said pilot valve when said pilot valve operator is deenergized; an electric igniter for said pilot burner; a normally closed transfer switch, a normally open transfer switch, transfer switch operating electric means operable when energized to open said normally closed transfer switch and close said normally open transfer switch and a thermo-electric generator adjacent said electric igniter and said pilot burner for energizing said transfer switch operating means when said pilot burner is in operation; an electric relay having a first normally open load switch, a second normally open load switch and electric operating means operable when energized to close both said load switches; a source of electric power; a normally open electric thermostat responsive to the temperature in said space and a first circuit means for cooperating with said source of power and said thermostat at a preset temperature in said space to energize said relay operating means to close both said load switches; a second circuit means for cooperating with said source of power and said first load switch to energize said motor means to actuate said air induction means to lower the air pressure in said furnace to actuate said air safety switch operating means to close said air safety switch; a third circuit means for cooperating with said source of power, said second load switch, said air safety switch and said two time switches simultaneously to energize said pilot valve operator to open said pilot gas valve and, to energize said electric igniter for said pilot burner, to light said pilot burner, whereby said pilot burner will heat said thermoelectric generator, said generator will energize said transfer switch operating means to open said normally closed transfer switch and to close said normally open transfer switch, whereby the opening of said normally closed transfer switch will deenergize said igniter and said safety timing means and the closing of said normally open transfer switch will energize said main valve operator to open said main valve to supply gas to said main gas burner and said main gas burner will be ignited from said pilot gas burner to supply heat to said space and raise the temperature therein whereby said thermostat will open to de-energize said circuits.

2. An induced draft gas fired heating system for supplying heat to a space in response to a temperature drop therein, said system including a furnace, a main gas burner in said furnace, a main gas valve for admitting fuel gas to said main gas burner, a main valve operator operable when electrically energized to open said main valve; a pilot gas burner in said furnace adjacent said main gas burner, a pilot gas valve for admitting fuel gas to said pilot gas burner, a pilot valve operator operable when electrically energized to open said pilot valve, a motor driven fan for inducing combustion air into said furnace, a first load switch operable when closed electrically to energize said motor, a transformer having a primary winding and a secondary winding with a third terminal intermediate its first and second end terminals, a second load switch operable when closed to energize said primary winding of said transformer, a load switch operator operable when energized to close said first load switch and said second load switch in sequence, a thermostat responsive to a temperature in said space for energizing said load switch operator; a first safety time switch, a second safety time switch, a safety time switch operator operable when electrically energized to time out a preset safety time period and then open both said time switches, an electric igniter for said pilot burner, an air safety switch, means responsive to the rate of induction of combustion air into said furnace to close said air safety switch at a preset value of said rate, a single pole double throw transfer switch having a starting position and a running position, means responsive to the burning of said pilot burner to throw said transfer switch from its starting position to its running position, said time switch operator being connected in series with said first and third transformer terminals and the starting position of said transfer switch; said pilot burner igniter being connected in series with said time switch operator and said first time switch, said pilot valve operator being connected in series with said second and third transformer terminals, said air safety switch and said second time switch, and said main valve operator being connected in series with said second and third transformer terminals, said air safety switch and said running position of said transfer switch.

3. The heating system of claim 2 in which said operators for said load switches, said main gas valve and said pilot gas valve each include an operating stem, a bimetallic operator, an electric heater for energizing said bimetallic operator and a link interposed between said stem and said operator, said bimetallic operator having a fixed end and a free end, one end of said link being rotatably connected to the free end of said bimetallic operator on an axis perpendicular to the direction of its thermally forced motion, said link and said bimetallic operator including cooperating means thereon for limiting the motion of said link in either direction about said axis with respect to said bimetallic operator and frictional means for resisting the motion of said link about said axis with respect to said bimetallic operator.

4. For use in a control system for an induced draft gas fired heating system for supplying heat to a space in response to a loss of temperature therein, said system being operable in response to the sequential closure of a pair of load switches, an operating stem for said pair of switches, a bimetallic operator for said stem, an electric heater for energizing said bimetallic operator, a thermostat for energizing said heater in response to the temperature in said space and a link interposed between said stem and said bimetallic operator, said bimetallic operator having a fixed end and a free end, one end of said link being rotatably connected to the free end of said bimetallic operator on an axis perpendicular to the direction of its thermally forced motion, said link and said bimetallic operator including cooperating means therewith for limiting the motion of said link in either direction about said axis with respect to said bimetallic operator and frictional means for resisting the motion of said link about said axis with respect to said bimetallic operator.

5. For use in a control system for an induced draft gas fired heating system for supplying heat to a space in response to a loss of temperature therein, a pair of gas valve structures for controlling the fuel gas supplied to said system in response to the sequential closure of a pair of load switches, said system having means responsive to a temperature in said space for sequentially closing said load switches and each of said gas valve structures including a valve, an operating stem for said valve, a bimetallic operator for said stem, an electric heater for energizing said bimetallic operator, means responsive to the closure of both said load switches for energizing said heater and a link interposed between said stem and said bimetallic operator, said bimetallic operator having a fixed end and a free end, one end of said link being rotatably connected to the free end of said bimetallic operator on an axis perpendicular to the direction of its thermally forced motion, said link and said bimetallic operator including cooperating means therewith for limiting the motion of said link in either direction about said axis with respect to said bimetallic operator and frictional means for resisting the motion of said link about said axis with respect to said bimetallic operator.

6. An electric control system including a source of electric power, a condition responsive electric switch, a pair of load switches, means mounting said switches for rotation together in alternate directions sequentially to close both said switches on rotation in one direction of said mounting means and sequentially to open both said switches on rotation in the other direction on said mounting means, a bimetallic operator for said mounting means, an electric heater energized from said source of power through said condition responsive switch to heat said operator to rotate said operator in one direction, slip means connecting said bimetallic operator with said mounting means, means for limiting in either direction the slip of said slip means relative to said bimetallic operator and stop means for said mounting means to limit the rotation of said mounting in either of its directions of rotation.

7. An electric control system including a source of electric power, a fluid flow control valve and an operator for said valve, said valve operator comprising a bimetal element fixed at one end, a stem for said valve, means for guiding said valve stem for free movement axially thereof, means for limiting the movement of said stem in either of its axial directions, a link element freely pivoted at one end to the free end of said valve stem and pivoted with frictional motion restraint means at its other end to the free end of said bimetal element, together with means for heating said bimetal element in response to a requirement for operating said valve stem in one of its axial directions and said frictionally pivoted free end of said bimetal and said other end of said link element having cooperatively associated therewith means limiting their relative motion in either direction.

References Cited in the file of this patent

UNITED STATES PATENTS

| | | |
|---|---|---|
| 1,697,432 | Martin | Jan. 1, 1929 |
| 2,164,511 | Furlong | July 4, 1939 |
| 2,250,113 | Lockrae | July 22, 1941 |
| 2,331,737 | Sloggin | Oct. 12, 1943 |
| 2,553,062 | Riehl | May 15, 1951 |
| 2,660,645 | Deubel | Nov. 24, 1953 |
| 2,695,054 | Millerwise et al. | Nov. 23, 1954 |
| 2,839,132 | Blackett et al. | June 17, 1958 |